United States Patent [19]

White et al.

[11] 4,328,974
[45] May 11, 1982

[54] STUFFING BOX PACKING SYSTEM AND METHOD

[76] Inventors: Richard E. White, R.D. #1, P.O. Box 395, Newark, N.Y. 14512; David G. White, 37 Park St., Phelps, N.Y. 14532

[21] Appl. No.: 122,365

[22] Filed: Feb. 19, 1980

[51] Int. Cl.³ .................. F16J 15/24; F16K 41/04
[52] U.S. Cl. .......................... 277/122; 277/115; 277/116.2; 277/DIG. 6; 277/1; 251/214
[58] Field of Search ............... 251/191, 214; 277/102, 277/1, 117–122, 116.6, 116.8, 115, 116.2, DIG. 6

[56] References Cited

U.S. PATENT DOCUMENTS

| 849,837 | 4/1907 | Eggleston | 277/115 |
|---|---|---|---|
| 883,534 | 3/1908 | Garlock | |
| 1,979,141 | 10/1934 | Clark et al. | 277/115 |
| 2,880,022 | 3/1959 | Schultze | 277/115 |
| 3,108,018 | 10/1963 | Lewis | 277/DIG. 6 X |
| 3,179,426 | 4/1965 | Duer | 277/112 |
| 3,227,464 | 1/1966 | Makin | 277/105 |
| 3,582,041 | 6/1971 | Priese | 251/214 X |
| 3,773,337 | 11/1973 | Adams | 277/90 X |
| 3,841,289 | 10/1974 | Meyers | 277/233 X |
| 4,006,881 | 2/1977 | Gaillard | 277/DIG. 6 X |
| 4,026,517 | 5/1977 | Still | 251/214 |
| 4,068,853 | 1/1978 | Schnitzler | 277/102 |
| 4,157,835 | 6/1979 | Kahle et al. | 277/DIG. 6 X |
| 4,190,257 | 2/1980 | Schnitzler | 277/DIG. 6 X |

FOREIGN PATENT DOCUMENTS

| 294850 | 10/1969 | Australia | 277/115 |
|---|---|---|---|
| 926435 | 5/1973 | Canada | 277/106 |
| 1056660 | 6/1979 | Canada | 277/DIG. 6 |
| 2903453 | 8/1979 | Fed. Rep. of Germany | 277/DIG. 6 |
| 2816930 | 10/1979 | Fed. Rep. of Germany | 277/DIG. 6 |
| 7001682 | 8/1971 | Netherlands | 277/119 |

Primary Examiner—Robert S. Ward, Jr.

[57] ABSTRACT

A packing (10) for a stuffing box (12), for example, for petrochemical and/or power industry valves including one or more low density, graphite preform rings (30 and 44) which are further compressed, when the packing gland is tightened, with controlled material flow into the remaining open areas to provide impervious and effective I.D. and O.D. seals. The preform rings (30 and 44) are preferably adjacent higher density graphite adapter rings (32 and 46) with the adjacent facing surfaces (34-36 and 40-42) of the preform and adapter rings, preferably, having acute angles of 45° and 60°, respectively, with respect to the axis of the packing.

82 Claims, 4 Drawing Figures

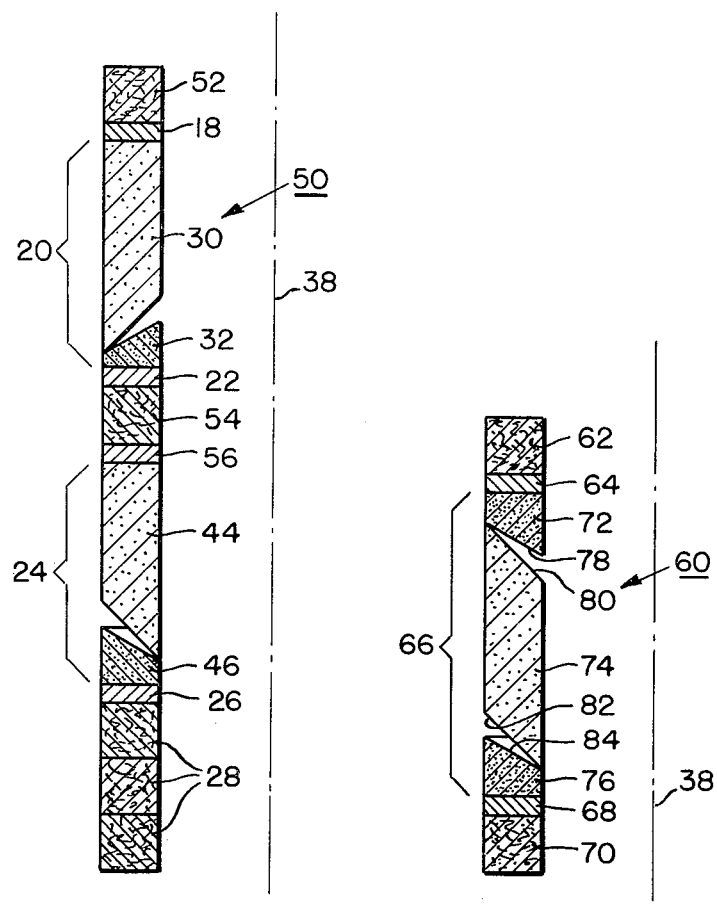

STUFFING BOX PACKING SYSTEM AND METHOD

TECHNICAL FIELD

This invention relates to stuffing box packings and in a preferred embodiment to an emissionless valve stem packing system for the petrochemical industry.

BACKGROUND

A wide variety of packings for stuffing boxes for all types of piston rods, valve stems, shafts and the like are well-known. For example, graphite tape (such as that sold under the trademark GRAPH-LOCK by Garlock Inc) and braided graphite rings (such as that sold under the trademark GARLOCK STYE #98 sold by Garlock Inc) have been very effective packings in most applications. However, when installed into petrochemical industry valves, due to excessive stuffing box-to-stem dimensional tolerances, some leakage has been recorded. GRAPH-LOCK tape, when re-formed under the amount of load that can be applied in ordinary valve housings in the petrochemical industry, will not cold flow sufficiently to provide effective sealing of up to 1/32" clearances when supplied in its standard density of 1.4 g/cc. GARLOCK STYLE #98, being a soft braided packing, allows sight leakage under most high-pressure applications. U.S. Pat. Nos. 883,534 and 3,227,464 show two examples of prior art packings.

In addition, California has amended its law to require less emissions from petro-chemical pumps and valves. To date, pump and valve stem packings required leakage to lubricate wearing surfaces. When utilizing a carbon-graphite system in such valve stem packings, further lubrication after installation is unnecessary. Most petro-chemical industries schedule a routine preventative maintenance tear down inspection, where valves and pumps are reconditioned, thus extending overall service life. It is not uncommon to remachine a valve stem 1/32" to 1/16" overall to renew the sealing surfaces. During disassembly, the gland is cleaned to remove corrosion and system deposits. Both of these operations alter the sealing surfaces resulting in a leakage path upon reassembly using standard packing materials. Use of conventional packing such as braided constructions, twisted rope, and flexible graphite all have limitations. Braided and twisted constructions are porous and dimensionally unstable. Flexible graphite can be made impervious by compression molding causing severe limitations in material flow and excessive sealing stress.

It is an object of the present invention to provide an extremely flexible, effective, and economical packing system. It is another object to use a system of braided packing and flexible graphite to provide such advantages.

It is a further object of this invention to use two different densities of flexible graphite to control material flow and sealing pressure. It is another object to use a difference in angles between a high-density graphite adapter ring and a low density graphite preform ring to provide a predictable stress and material flow. Under low to moderate stress, the difference in angles will provide deflection of the preform toward the designed sealing surface. Further loading will compress the flexible graphite to a previously calculated sealing density. The initial material flow will fill the gap caused by design, wear, stem refurbishment, and gland distortion.

It is another object of this invention to provide a low density, graphite preform ring having a density of less than 1.1 g/cc and preferably of 0.7 g/cc and having means for maintaining its structural integrity.

BRIEF SUMMARY OF THE INVENTION

An emissionless packing article, apparatus and method, particularly for valve stems of petrochemical and power industry valves, including one or more preform rings made of a low density, compressible, reformable material such as preferably a flexible graphite material. By tightening the gland, the material of the low density preform ring is re-formed (i.e. is deformed and caused to move) against the stem and/or against the stuffing box to form an I.D. and/or an O.D. seal. A high density adapter ring (preferably also made of graphite) is preferably in contact with each low density preform ring, with the pair of rings making up either an I.D. or an O.D. sealing assembly.

The packing can include a separate pair of such rings to provide each of the I.D. and O.D. seals. Alternatively, both the I.D. and O.D. seals can be provided using an assembly including only three rings, that is, one preform ring in-between two adapter rings.

The packing assembly preferably also includes one or more compressible packing rings, preferably a braided carbon fiber wiper ring (such as GARLOCK STYLE #98), and also impervious pressure barrier washers or spacer rings. The washers are preferably a filled polytetrafluoroethylene ring (such as that sold under the trademark GYLON by Garlock Inc) when used with temperatures below 450° F. Metal washers, preferably of aluminum, are preferably used above 450° F.

The facing surfaces of the high and low density rings are preferably at an acute angle to the longitudinal axis of the packing. The facing surface of the adapter ring is preferably about 60° and the facing surface of the preform ring is perferably about 45° to such longitudinal axis, thus providing a preferable difference in angles of about 15°. The difference in angles provides one method for controlling the deformation or re-forming of the lower density flexible graphite preform ring so as to insure the formation of the I.D. or O.D. seal. Other acute angles and other differences in angles can be used. The facing surfaces can also be normal (90°) to the packing axis. The flexible graphite material moves into the annular space between the packing and either the stem or the stuffing box.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIGS. 3 and 4 are each partial cross-sectional views of other packings according to the present invention shown prior to tightening of the gland.

DETAILED DESCRIPTION OF THE INVENTION

Figures 1, 2:
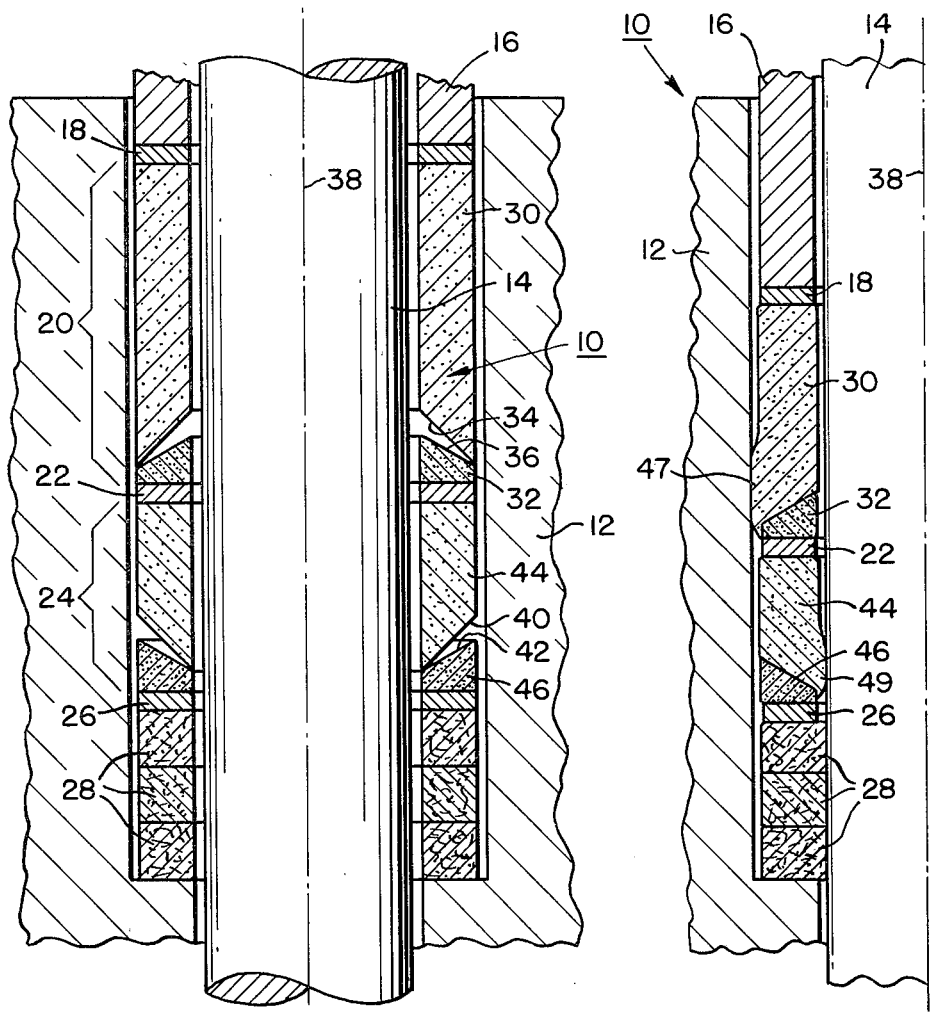
FIG. 1 is a cross-sectional view through a stuffing box, stem and packing of the present invention prior to tightening of the gland.
FIG. 2 is a partial cross-sectional view showing the packing of FIG. 1 after a partial tightening of the gland.

With reference now to the drawings, FIGS. 1 and 2 show a preferred embodiment of the present invention, for use as an emissionless valve stem packing in the petrochemical industry. It should be noted that the degree of radial movement required of the packing in FIGS. 1 and 2 to provide effective sealing, has been exaggerated in the drawing.

FIGS. 1 and 2 show a preferred packing 10 according to the present invention, for use in a stuffing box 12 for sealing a stem 14 of a valve (not shown) controlling fluid flow through a conduit (not shown). FIG. 1 also shows a portion of a packing gland 16, which when tightened will move downwardly as shown in FIG. 2 so as to compress the packing 10. The operation of such valves and stuffing boxes are well-known and need not be described in detail here.

Referring to FIG. 1, the packing 10 comprises the following elements, from top to bottom (the term "top to bottom" is hereby defined to mean from outside to inside) of the packing: a first rigid, impervious spacer ring 18, a first sealing assembly 20, a second rigid, impervious spacer ring 22, a second sealing assembly 24, a third rigid, impervious spacer ring 26, and three compressible packing rings 28.

The first sealing assembly 20 provides an O.D. seal and the second sealing assembly 24 provides an I.D. seal, when the gland 16 is tightened. Each of the sealing assemblies 20 and 24 preferably includes a low density, flexible graphite ring which re-forms during packing installation (tightening of the packing gland 16) to provide one of the O.D. and I.D. seals. When the gland 16 is tightened, the low density material is deformed against the stuffing box or the stem as will be described below.

The first sealing assembly 20 comprises a low density graphite preform ring 30 and a higher density graphite die-formed adapter ring 32. The preform preferably has a density of about 0.7 g/cc and the adapter preferably has a density of about 1.4 g/cc. The rings 30 and 32 are adjacent to each other and have facing surfaces 34 and 36, respectively. Both surfaces 34 and 36 are at an acute angle to the longitudinal axis 38 of the packing 10, in the axially inner direction. The angle of the surface 34 is preferably about 45° and the angle of the surface 36 is peferably about 60°. The densities and angles will be discussed further below regarding the tightening of the gland 16 to further compress the preform as shown in FIG. 2.

The second sealing assembly 24 is very similar to the sealing assembly 20 except for the direction of the angles of the facing surfaces 40 and 42. The sealing assembly 24 comprises a low density graphite preform ring 44 and a higher density graphite adapter ring 46. The preform ring 44 has a density of about 0.7 g/cc and the adapter ring 46 has a density of about 1.4 g/cc. The facing surfaces 40 and 42 of the rings 44 and 46, respectively, are each at an acute angle to the longitudinal axis 38 of the packing 10, in the axially outer direction. The angle of surface 40 is preferably about 45° and the angle of the surface 42 is preferably about 60°.

The spacer rings 18,22, and 26 are preferably flat, rigid, impervious, and all identical and are preferably made of a filled polytetrafluoroethylene (such as that sold under the trademark GYLON by Garlock Inc) for applications below 450° F. and are preferably made of metal, such as aluminum, for applications above 450° F. These spacer rings (or washers) provide:

(1) a pressure block for emission particulates diverting the leakage path toward the diametrical surfaces where the flexible graphite preform rings are most effective seals,
(2) a load distribution surface so that uniform compression of the flexible graphite rings is assured, and
(3) the aluminum being less noble than either graphite or the valve components will act as a sacrificial element to eliminate or reduce electrolytic action between the valve components and the graphite packing.

The spacer rings are preferably provided with a pair of radially opposed holes to facilitate removal.

The compressible packing rings 28 are preferably made of braided carbon fibers and serve as wipers to eliminate the tendency of any of the material from the preform or adapter rings to adhere to the stem or rod 14. The rings 28 are preferably a soft carbon fiber braided packing (such as that sold under the trademark GARLOCK SYTLE #98 by Garlock Inc). Initially, due to the stress resulting from compression some graphite particles adhere to the stem when the valve is activated. The braided rings 28 act as wipers to strip the graphite particles from the stem and absorb them into the braid, thus restricting leakage paths by filling voids in the braid. The fine graphite particles provide a self-lubrication extending the service life of the emissionless valve stem packing system.

FIG. 2 shows the packing 10 of FIG. 1 after the packing gland 16 has been at least partially tightened. As shown in FIG. 2, the low density preform rings 30 and 44 are forced to move, flow, or re-form into the remaining open area and to be further compressed to provide an impervious and effective O.D. seal 47 and an I.D. seal 49, respectively. Both FIGS. 1 and 2 show portions of the packing assembly exaggeratedly spaced away from the stuffing box and stem in order to better illustrate the manner in which the preform rings 30 and 44 are forced to move and form I.D. and O.D. seals. In addition, FIG. 2 shows the packing 10 after it has been about half way compressed. When the packing 10 is fully compressed, the portions of the preforms 30 and 44 represented by the seals 47 and 49, respectively, will actually have moved further down (in FIG. 2) to and past the spacer rings 22 and 26, respectively. The preform rings 30 and 44, the adapter rings 32 and 46, and the braided rings 28 will actually be in contact with both the stem 14 and the stuffing box 12, as will be understood by those skilled in the art. Further, the distances between the spacer rings and the stuffing box and stem are not drawn to scale; the spacer rings would be dimensioned for use in this invention in the same way as they are used with known packings in the prior art.

FIGS. 1 and 2 show the normally preferred arrangement wherein two sealing assemblies 20 and 24 are used, one for the outside diametrical leakage and one for the inside diametrical leakage. However, other arrangements can be used, such as a single preform for both leakage paths for use with smaller size packings (as shown in FIG. 4). Other arrangements can also be used with respect to the locations of the braided packing rings 28 (one other such arrangement is shown in FIG. 3).

At present, most prior art die-formed graphite stem seals are compressed to a density of between 1.3 and 1.8 g/cc. Previously, if seals were made to less than 1.1 g/cc., flexibility and integrity were sacrificed. The adapter rings 32 and 46 are die-formed to a predetermined density (normally from about 1.4 to 1.7 g/cc). The preform rings 30 and 44 are flexible graphite rings of significantly lesser density (approximately 0.5 to 1.4 g/cc). Upon compression (as shown in FIG. 2), the lower density preform rings are further compressed into the remaining open area providing impervious and effective seals.

The difference in angles between the high-density adapter rings and the low-density preform rings provides a predictable stress, causing material flow. Under low to moderate stress, the difference in angle will provide compression of the preform toward the designed sealing surface. Further compression will compress the flexible graphite in the preform ring to a previously calculated sealing density. The initial material flow will fill the gap caused by design, wear, stem refurbishment, and gland distortion.

It will thus be seen that the packing 10 of the present invention includes a low density preform ring that is compressible and re-formable, and means, when axial compressive force is applied to the packing, for forcing the material adjacent one radial edge of one end of the preform ring, to move axially and to move radially in the direction away from the preform ring, and for further compressing the material that has moved or is moving into an impervious and effective seal. The material adjacent the radially outer edge of preform ring 30 moves radially outwardly to form an O.D. seal and the material adjacent the radially inner edge of preform ring 44 moves radially inwardly to form an I.D. seal.

FIG. 3 shows a preferred packing 50 (in its condition prior to tightening the packing gland) for use in a stuffing box as shown in FIG. 1.

The packing 50 is identical to the packing 10 with a few exceptions; the identical elements have the same reference numerals as in FIGS. 1 and 2. The packing 50 includes certain elements in addition to those in the packing 10 of FIG. 1, namely, a braided packing ring 52 on top of the first rigid, impervious spacer ring 18 and a braided packing ring 54 (plus another spacer ring 56) between the two sealing assemblies 20 and 24. When the packing gland is tightened, the two low density preforms 30 and 44 undergo a controlled material flow as shown in FIG. 2.

FIG. 4 shows a packing 60 (in its condition prior to tightening the packing gland) for use in a stuffing box as shown in FIG. 1. The packing 60 is especially useful in applications requiring a smaller size packing. The packing 60 includes in order from top to bottom: a first braided packing ring 62, a first rigid impervious spacer ring 64, a sealing assembly 66, a second rigid, impervious spacer ring 68, and a second braided packing ring 70. The sealing assembly 66 includes a first adapter 72, a preform 74, and a second adapter 76. The first adapter 72 and the upper (axially outer) end of the preform 74 have facing surfaces 78 and 80, at an acute angle to the longitudinal axis of the packing, in the axially outer direction. The angle of the surface 78 is preferably about 60° and the angle of the surface 80 is preferably about 45°. The second adapter 76 and the bottom end of the preform 74 have facing surfaces 82 and 84, at an acute angle to the longitudinal axis of the packing, also in the axially outer direction. The angle of the surface 82 is preferably about 45° and the angle of the surface 84 is preferably about 60°.

By tightening the packing gland of the stuffing box in which the packing 60 is installed, the preform 74 is further compressed and its upper and lower ends reform to provide O.D. and I.D. seals respectively, similar to those shown in FIG. 2.

The seal 50 shown in FIG. 3 underwent an extensive (50,000 cycle) stem cycling test conducted at moderate pressure using an 8" globe valve. The test was to evaluate the durability and sealing effectiveness of the packing of the present invention against a liquid petroleum medium (kerosene) and a short hydrocarbon vapor (propane) test to assess packing sealability after extensive stem cycling. The packing system of the present invention demonstrated low ($<25$ ppm) hydrocarbon emission rates for kerosene at 450 psig pressure until approximately 35,000 stem cycles, when visible kerosene leakage was observed. A single readjustment of the gland flange bolting torque to its initial (50 ft-lb) level effectively curtailed the leakage and enabled completion of the 50,000 cycle test with continued low emissions. A subsequent propane emission test resulted in relatively low ($<60$ ppm) vapor leakage over a limited number of stem strokes. Stem stroke was a vertical (5") reciprocating motion through the valve stuffing box with no rotation about the stem axis. The emissionless packing system used braided carbon fiber packing, for the rings 52, 54 and 28, graphitic tape-wound rings for the adapter and preform rings 30, 32, 44, and 46 and aluminum spacers. Nominal packing dimensions were $2\frac{1}{4}'' \times 1\frac{1}{2}'' \times 3\frac{1}{2}''$. Minimum gland pressure required to effect a seal was employed at startup and throughout the test. The fully assembled valve was operated during normal day shift working hours only (7:30 A.M.–4:00 P.M.). The valve assembly was visually inspected for general operability and leakage at least three times per day. Gland flange bolting torque, initially set at 40 ft-lbs for the start of the kerosene test, was increased to 50 ft-lbs early into the cycling test to maintain adequate sealing. No increase in bolt torque above the 50 ft-lb level was required for the remainder of the test. Upon completion of the test and inspection, it was seen that the packing had not yet been compressed to its maximum possible density (i.e. there was room for additional compression).

The invention has been described in detail with particular reference to the preferred embodiments thereof, but it will be understood that variations and modifications can be affected within the spirit and scope of the invention as described hereinafter and as defined in the appended claims. For example, other densities and materials can be used for the preform and for the adapter. In fact, the adapter can be a rigid metal ring. The preform need not be graphite; other low density, compressible, re-formable sealing materials can be used such as various plastics, urethane resins, composite rubber materials, etc. Other angles can also be used for the angles of the facings surfaces of the preform and adapter rings, and in fact the one or both of the facing surfaces can be normal (90°) to the longitudinal axis of the packing. The graphite adapter and preform rings can be either tape wound (also known as spiral wrapped) or laminated (meaning "sandwiched" using flat layers of graphite). Other materials can also be used for the compressible packing rings in place of the braided carbon fiber packing, which is compatible with the graphite preform and adapter rings. For example, when using a plastic preform, a compressible packing compatible therewith would be used. These packing rings can be evenly located throughout the packing, or in a high pressure application, additional ones can be added at the bottom. The term "stem" as used in the present specification and claims includes piston rods, valve stems, reciprocating and/or rotating shafts, etc. The preform can have uniform density or not, as long as the end thereof has a low density such that it will flow radially and axially into the open area and against and into contact with either the stem or stuffing box and will then compress into an impervious and effective seal. The higher density adapter ring is preferably positioned between the preform and the fluid under pressure. The term "packing installation" means during the period that the packing gland is initially tightened. In addition, a separate adapter ring can be eliminated by using the spacer ring to do the job of the adapter ring in forcing the preform ring in the desired fashion. The spacer ring can be formed with its surface facing the preform ring at an angle of preferably 60°. In this case, the spacer ring would also be the "adapter ring".

The preform and adapter rings are preferably made from the same graphite tape having a density of about 1.1 g/cc. The preform ring as made preferably has a density of about 0.7 g/cc and the adapter ring preferably has a density of about 1.4 g/cc. The term "low density" with reference to the preform ring is hereby defined to mean a density in the range of from about 0.5 to 1.4 g/cc. The "higher density" adapter simply has a higher density than that of the preform, and when the adapter is made of graphite, is in the range of from about 1.4 to 1.7 g/cc. Further, while the adapter is preferably always located toward the pressure, this is not essential and the preform can be located toward the pressure. The preferred packing according to the present invention employs at least one sealing assembly to form each of an I.D. and an 0.D. seal, however, a packing can employ only one sealing assembly for either an I.D. or an O.D. seal, or several sealing assemblies all providing an I.D. seal or all providing and O.D. seal, if desired, and still obtain benefits from the present invention.

The low density preform rings of this invention, when formed of tape wound graphite, are preferably held together during formation, handling, and installation by the use of a minimum amount of adhesive, preferably a rubber based adhesive, under the innermost and outermost plies. For laminated graphite preform rings, adhesive would preferably be used on every layer. Other means can be used for maintaining the structural integrity of the preform rings including, for example, mechanical means such as zinc staples.

We claim:

1. A packing for a stuffing box comprising:
   (a) a low density graphite preform ring that is compressible and re-formable during packing installation to form at least one of an I.D. or an O.D. seal, and
   (b) means, when axial compressive force is applied to said packing, for forcing the material adjacent one radial edge of one end of said preform ring to move axially and radially in the direction away from said preform ring, and for further compressing said material into an impervious and effective seal, said forcing means being a higher density adapter ring having one end thereof adjacent said one end of said preform ring, said rings having facing surfaces each at an acute angle to the longitudinal axis of said packing and wherein said angles are different, the other end of said adapter ring having a surface substantially perpendicular to the longitudinal axis of said packing, and said angled facing surface of said adapter ring being flat and extending across the entire width of said adapter ring.

2. The packing as recited in claim 1 wherein said preform ring has a density of about 0.7 g/cc, and includes means for maintaining the structural integrity thereof.

3. The packing as recited in claim 1 wherein said one end of said preform ring is adapted to form an O.D. seal, wherein said acute angles are in the axially inner direction, and wherein the acute angles of said preform and adapter rings are approximately 45° and 60°, respectively.

4. The packing as recited in claim 3 wherein said preform ring has a density of about 0.7 g/cc, and includes means for maintaining the structural integrity thereof.

5. A packing for a stuffing box comprising:
   (a) a low density graphite preform ring that is compressible and re-formable during packing installation to form at least one of an I.D. or an O.D. seal, said preform ring having a density of about 0.7 g/cc, and including means for maintaining the structural integrity thereof.
   (b) means, when axial compressive force is applied to said packing, for forcing the material adjacent one radial edge of one end of said preform ring to move axially and radially in the direction away from said preform ring, and for further compressing said material into an impervious and effective seal, said forcing means comprising a higher density adapter ring having one end thereof adjacent said one end of said preform ring, and
   (c) said rings having facing surfaces each at an acute angle to the longitudinal axis of said packing, said angles being different, said one end of said preform ring being adapted to form an O.D. seal, said acute angles being in the axially inner direction, being the acute angles of said preform and adapter rings being approximately 45° and 60°, respectively, said adapter ring being a higher density graphite ring with a density of about 1.4 g/cc.

6. The packing as recited in claim 5 including a pair of rigid, flat spacer rings of impervious material in contact with the opposite ends of said preform and adapter rings.

7. The packing as recited in claim 6 including at least one braided carbon fiber wiper ring in said packing.

8. The packing as recited in claim 1 wherein said one end of said preform ring is adapted to form an I.D. seal, wherein said acute angles are in the axially outer direction, and wherein the acute angles of said preform and adapter rings are approximately 45° and 60°, respectively.

9. The packing as recited in claim 8 wherein said preform ring has a density of about 0.7 g/cc, and includes means for maintaining the structural integrity thereof.

10. A packing for a stuffing box comprising:
    (a) a low density graphite preform ring that is compressible and re-formable during packing installation to form at least one of an I.D. or an O.D. seal, said preform ring having a density of about 0.7 g/cc, and including means for maintaining the structural integrity thereof, (b) means, when axial compressive force is applied to said packing, for forcing the material adjacent one radial edge of one end of said preform ring to move axially and radially in the direction away from said preform ring, and for further compressing said material into an impervious and effective seal, said forcing means comprising a higher density adapter ring having one end thereof adjacent said one end of said preform ring, and (c) said rings having facing surfaces each at an acute angle to the longitudinal axis of said packing, said angles being different, said one end of said preform ring being adapted to form an I.D. seal, said acute angles being in the axially outer direction, the acute angles of said preform and adapter rings being approximately 45° and 60°, respectively, and said adapter ring being a higher density graphite ring with a density of about 1.4 g/cc.

11. The packing as recited in claim 10 including a pair of rigid, flat spacer rings of impervious material in contact with the opposite ends of said preform and adapter rings.

12. The packing as recited in claim 11 including at least one braided carbon fiber wiper ring in said packing.

13. The packing as recited in claim 1 including another higher density adapter ring adjacent the other end of said preform ring, said other end of said preform ring having material that is flowable radially and axially, under axial compressive force, into adjacent open areas and that is compressible into an impervious and effective seal.

14. The packing as recited in claim 13 wherein said preform ring is made of graphite.

15. The packing as recited in claim 14 wherein said rings have facing surfaces each at an acute angle to the longitudinal axis of said packing.

16. The packing as recited in claim 15 wherein the acute angles of said facing surfaces of said preform are different from the acute angles of said facing surfaces of said adapter rings.

17. The packing as recited in claim 14 wherein said rings have facing surfaces at an acute angle to the longitudinal axis of said packing, and wherein said preform and adapter angles are different, and wherein said one end of said preform ring is adapted to form an O.D. seal, wherein said acute angles at said one end are in the axially outer direction, and wherein the acute angles of said preform and adapter at said one end are approximately 45° and 60° respectively, and wherein said other end of said preform ring is adapted to form an I.D. seal, wherein said acute angles at said other end are in the axially outer direction, and wherein the acute angles of said preform and adapter at said other end are approximately 45° and 60° respectively.

18. The packing as recited in claim 17 wherein said preform ring has a density of about 0.7 g/cc, and includes means for maintaining the structural integrity thereof.

19. The packing as recited in claim 18 wherein said adapter rings are higher density graphite rings having a density of about 1.4 g/cc.

20. A packing for a stuffing box comprising the following elements in order from the outside to the inside of the packing:

(a) a first compressible packing ring;
(b) a first, rigid, flat, impervious spacer ring;
(c) a first sealing assembly comprising a pair of adjacent rings having facing radial surfaces, one of which rings is re-formable during packing installation to provide one of an I.D. or an O.D. seal, said first sealing assembly comprising:
  (1) a first, low density preform ring made of compressible, re-formable sealing material,
  (2) a first higher density adapter ring having one end thereof adjacent one end of said preform ring, said one end of said preform ring having material that is flowable radially and axially, under axial compressive force, into adjacent open areas and that is compressible into an impervious and effective seal;
(d) a second, rigid, flat, impervious spacer ring;
(e) a second compressible packing ring;
(f) a third, rigid, flat impervious spacer ring;
(g) a second sealing assembly comprising a pair of adjacent rings having facing radial surfaces, one of which rings is re-formable during packing installation to provide one of an I.D. or an O.D. seal, said second sealing assembly comprising:
  (1) a second, low density preform ring made of compressible re-formable, sealing material,
  (2) a second higher density adapter ring having one end thereof adjacent one end of said preform ring, said one end of said preform ring having material that is flowable radially and axially, under axial compressive force, into adjacent open areas and that is compressible into an impervious and effective seal;
(h) a fourth, rigid, flat, impervious, spacer ring; and
(i) a third compressible packing ring.

21. The packing as recited in claim 20 wherein preform rings are made of graphite and wherein said compressible packing rings are made of braided carbon fiber.

22. The packing as recited in claim 21 wherein said spacer rings are made of filled polytetrafluoroethylene.

23. The packing as recited in claim 21 wherein said spacer rings are made of aluminum.

24. The packing as recited in claim 21 wherein said adapter rings are made of the same material as are said preform rings, but are compressed to a higher density.

25. The packing as recited in claim 21 wherein the density of said preform rings is about 0.7 g./cc, and includes means for maintaining the structural integrity thereof.

26. The packing as recited in claim 21 wherein the density of said adapter rings is about 1.4 g/cc.

27. The packing as recited in claim 21 wherein one of said first and second sealing assemblies is an O.D. sealing assembly.

28. The packing as recited in claims 27 wherein said first sealing assembly is adapted to provide an O.D. seal.

29. The packing as recited in claim 28 wherein said facing surfaces of said first sealing assembly are each at an acute angle to the longitudinal axis of said packing in the axially inner direction.

30. The packing as recited in claim 29 wherein said acute angle of said facing surface of said first preform is approximately 45°.

31. The packing as recited in claim 29 wherein said acute angle of said facing surface of said first adapter is approximately 60°.

32. The packing as recited in claim 31 wherein said acute angle of said facing surface of said first preform is approximately 45°.

33. The packing as recited in claim 21 wherein one of said sealing assemblies is an I.D. sealing assembly.

34. The packing as recited in claim 33 wherein said second sealing assembly is adapted to provide an I.D. seal.

35. The packing as recited in claim 34 wherein said facing surfaces of said second sealing assembly are each at an acute angle to the longitudinal axis of said packing in the axially outer direction.

36. The packing as recited in claim 35 wherein said acute angle of said facing surface of said second preform is approximately 45°.

37. The packing as recited in claim 35 wherein said acute angle of said facing surface of said second adapter is approximately 60°.

38. The packing as recited in claim 37 wherein said acute angle of said facing surface of said second preform is approximately 45°.

39. The packing as recited in claim 33 wherein the other of said sealing assemblies is an O.D. sealing assembly.

40. The packing as recited in claim 39 wherein said first sealing assembly is an O.D. sealing assembly and said second sealing assembly is an I.D. sealing assembly.

41. The packing as recited in claim 40 wherein said facing surfaces of said first sealing assembly are each at an acute angle to the longitudinal axis of said packing in the axially inner direction and wherein said facing surfaces of said second sealing assembly are each at an acute angle to the longitudinal axis of said packing in the axially outer direction.

42. The packing as recited in claim 41 wherein said acute angle of said facing surfaces of said preforms is approximately 45°.

43. The packing as recited in claim 42 wherein said acute angle of said facing surfaces of said adapters is approximately 60°.

44. The packing as recited in claim 43 wherein said spacer rings are made of filled polytetrafluoroethylene.

45. The packing as recited in claim 43 wherein said spacer rings are made of aluminum.

46. The packing as recited in claim 43 wherein said adapter rings are made of graphite.

47. The packing as recited in claim 46 wherein said adapter rings are made of the same material as are said preform rings, but are compressed to a higher density.

48. The packing as recited in claim 47 wherein the density of said preform rings is about 0.7 g/cc, and includes means for maintaining the structural integrity thereof.

49. The packing as recited in claim 48 wherein the density of said adapter rings is about 1.4 g/cc.

50. The packing as recited in claim 49 wherein said spacer rings are made of metal.

51. Apparatus comprising a stuffing box, a stem extending through said stuffing box, and a packing in said stuffing box, said packing comprising:
(a) a low density preform ring made of a sealing material that is compressible and reformable during packing installation to form at least one of an I.D. or an O.D. seal, and
(b) means, when axial compressive force is applied to said packing, for forcing the material adjacent one radial edge of one end of said preform ring to move axially and radially in the direction away from said preform ring, and for further compressing said material into an impervious and effective seal, said forcing means being a higher density adapter ring having one end thereof adjacent said one end of said preform ring, said rings having facing surfaces each at an acute angle to the longitudinal axis of said packing and wherein said angles are different, the other end of said adapter ring having a surface substantially perpendicular to the longitudinal axis of said packing, and said angled facing surface of said adapter ring being flat and extending across the entire width of said adapter ring.

52. The apparatus as recited in claim 51 wherein said preform ring is made of graphite.

53. The apparatus as recited in claim 52 wherein said one end of said preform ring is adapted to form an O.D. seal, wherein said acute angles are in the axially inner direction, and wherein the acute angles of said preform and adapter rings are approximately 45° and 60°, respectively.

54. Apparatus comprising a stuffing box, a stem extending through said stuffing box, and a packing in said stuffing box, said packing comprising:
(a) a low density preform ring made of a sealing material that is compressible and reformable during packing installation to form at least one of an I.D. or an O.D. seal, said preform ring being made of graphite,
(b) means, when axial compressive force is applied to said packing, for forcing the material adjacent one radial edge of one end of said preform ring to move axially and radially in the direction away from said preform ring, and for further compressing said material into an impervious and effective seal, said forcing means comprising a higher density adapter ring having one end thereof adjacent said one end of said preform ring, and
(c) said rings having facing surfaces at an acute angle to the longitudinal axis of said packing, said angles being different, said one end of said preform ring being adapted to form an O.D. seal, said acute angles being in the axially inner direction, the acute angles of said preform and adapter rings being approximately 45° and 60°, respectively, said preform ring having a density of about 0.7 g/cc. said adapter ring being a higher density graphite ring with a density of about 1.4 g/cc, and said preform ring including means for maintaining the structural integrity thereof.

55. The apparatus as recited in claim 54 including a pair of rigid, flat spacer rings of impervious material in contact with the opposite ends of said preform and adapter rings.

56. The apparatus as recited in claim 55 including at least one braided carbon fiber wiper ring in said packing.

57. The apparatus as recited in claim 52 wherein said one end of said preform ring is adapted to form an I.D. seal, wherein said acute angles are in the axially outer direction, and wherein the acute angles of said preform and adapter rings are approximately 45° and 60°, respectively.

58. Apparatus comprising a stuffing box, a stem extending through said stuffing box, and a packing in said stuffing box, said packing comprising:
(a) a low density preform ring made of a sealing material that is compressible and reformable during packing installation to form at least one of an I.D. or an O.D. seal, said preform ring being made of graphite, (b) means, when axial compressive force is applied to said packing, for forcing the material adjacent one radial edge of one end of said preform ring to move axially and radially in the direction away from said preform ring, and for further compressing said material into an impervious and effective seal, said forcing means comprising a higher density adapter ring having one end thereof adjacent said one end of said preform ring, and (c) said rings having facing surfaces at an acute angle to the longitudinal axis of said packing, said angles being different, said one end of said preform ring being adapted to form an I.D. seal, said acute angles being in the axially outer direction, the acute angles of said perform and adapter rings being approximately 45° and 60°, respectively, said preform ring having a density of about 0.7 g/cc, and said adapter ring being a higher density graphite ring with a density of about 1.4 g/cc.

59. The apparatus as recited in claim 58 including a pair of rigid, impervious, flat spacer rings in contact with the opposite ends of said preform and adapter rings.

60. The apparatus as recited in claim 59 including a braided carbon fiber ring in said packing.

61. A method for sealing a valve stem comprising installing in a stuffing box for said stem a packing including a low density preform ring of sealing material that is compressible and re-formable, installing in contact with one end of said preform, one end of a higher density adapter ring, axially compressing said packing and forcing said one end of said preform to flow radially and axially into contact with one of said stem or stuffing box to provide one of an O.D. or I.D. seal, compressing said material into an impervious seal providing said preform and adapter facing surfaces with acute angles of about 45° and 60°, respectively, to the axis of said stem, providing the other end of said adapter ring with a surface substantially perpendicular to the axis of said stem, and providing said angled facing surface of said adapter ring as a flat surface extending straight across the entire width of said adapter ring.

62. The method as recited in claim 61 wherein said preform ring is made of graphite and has a density of about 0.7 g/cc.

63. A method for sealing a valve stem comprising installing in a stuffing box for said stem a packing including a low density preform ring of sealing material that is compressible and re-formable, said preform ring being made of graphite and having a density of about 0.7 g/cc, installing in contact with one end of said preform a higher density adapter ring, providing said adapter ring as a graphite ring having a density of about 1.4 g/cc, providing the facing surfaces of said preform and adapter with acute angles of about 45° and 60°, respectively, to the axis of said stem, axially compressing said packing and forcing said one end of said preform to flow radially and axially into contact with one of said stem or stuffing box to provide one of an O.D. or I.D. seal and compressing said seal into an impervious seal.

64. The method as recited in claim 63 including compressing said preform and adapter rings between a pair of rigid flat spacer rings.

65. The method as recited in claim 64 wherein said installing step includes installing at least one braided graphite wiper ring with said preform and adapter rings.

66. The method as recited in claim 65 wherein said adapter ring installing step includes installing two adapter rings, one in contact with each end of said preform ring.

67. The method as recited in claim 66 including forming both sets of said facing surfaces at an acute angle to said stem in the axially outer direction.

68. A packing for a stuffing box comprising:
(a) a low density graphite preform ring that is compressible and re-formable during packing installation to form at least one of an I.D. or an O.D. seal, said preform ring having a density in the range of from about 0.5 to 1.4 g/cc and including means for maintaining the structural integrity thereof, (b) means, when axial compressive force is applied to said packing, for forcing the material of said preform ring adjacent one radial edge of one end of said preform ring to move axially and radially in the direction away from said preform ring, and for further compressing said material of said preform ring into an impervious and effective seal, said forcing means comprising a higher density adapter ring made of a deformable, compression sealing material that has a density in the range of from about 1.4 to 1.7 g/cc, said adapter ring having one end thereof adjacent said one end of said preform ring, and (c) said rings having facing surfaces each at an acute angle to the longitudinal axis of said packing, said angles being different, said one end of said preform ring being adapted to form an O.D. seal, and said acute angles being in the axially inner direction.

69. The packing according to claim 68 wherein said acute angles of said preform and adapter rings are approximately 45° and 60° respectively.

70. The packing according to claim 69 wherein said adapter ring is a higher density graphite ring.

71. A packing for a stuffing box comprising:
(a) a low density graphite preform ring that is compressible and re-formable during packing installation to form at least one of an I.D. or an O.D. seal, said preform ring having a density in the range of from about 0.5 to 1.4 g/cc, and including means for maintaining the structural integrity thereof, (b) means, when axial compressive force is applied to said packing, for forcing the material of said preform ring adjacent one radial edge of one end of said preform ring to move axially and radially in the direction away from said preform ring, and for further compressing said material of said preform ring into an impervious and effective seal, said forcing means comprising a higher density adapter ring made of a deformable, compression sealing material that has a density in the range of from about 1.4 to 1.7 g/cc, said adapter ring having one end thereof adjacent said one end of said preform ring, and (c) said rings having facing surfaces each at an acute angle to the longitudinal axis of said packing, said angles being different, said one end of said preform ring being adapted to form an I.D. seal, and said acute angles being in the axially outer direction.

72. The packing according to claim 71 wherein said acute angles of said preform and adapter rings are approximately 45° and 60° respectively.

73. The packing according to claim 72 wherein said adapter ring is a higher density graphite ring.

74. Apparatus comprising a stuffing box, a stem extending through said stuffing box, and a packing in said stuffing box, said packing comprising:
  (a) a low density graphite preform ring having a density in the range of from about 0.5 to 1.4 g/cc and being compressible and reformable during packing installation to form at least one of an I.D. or an O.D. seal,
  (b) means, when axial compressive force is applied to said packing, for forcing the material of said preform ring adjacent one radial edge of one end of said preform ring to move axially and radially in the direction away from said preform ring, and for further compressing said material of said preform ring into an impervious and effective seal, said forcing means comprising a higher density adapter ring made of a deformable, compression sealing material that has a density in the range of from about 1.4 to 1.7 g/cc, said adapter ring having one end thereof adjacent said one end of said preform ring, and
  (c) said rings having facing surfaces at an acute angle to the longitudinal axis of said packing, said angles being different, said one end of said preform ring being adapted to form an O.D. seal, said acute angles being in the axially inner direction and said preform ring including means for maintaining the structural integrity thereof.

75. The apparatus according to claim 74 wherein said acute angles of said preform and adapter rings are approximately 45° and 60° respectively.

76. The apparatus according to claim 75 wherein said adapter ring is a higher density graphite ring.

77. Apparatus comprising a stuffing box, a stem extending through said stuffing box, and a packing in said stuffing box, said packing comprising:
  (a) a low density graphite preform ring having a density in the range of from about 0.5 to 1.4 g/cc and being compressible and reformable during packing installation to form at least one of an I.D. or an O.D. seal,
  (b) means, when axial compressive force is applied to said packing, for forcing the material of said preform ring adjacent one radial edge of one end of said preform ring to move axially and radially in the direction away from said preform ring, and for further compressing said material of said preform ring into an impervious and effective seal, said forcing means comprising a higher density adapter ring made of a deformable, compression sealing material that has a density in the range of from about 1.4 to 1.7 g/cc, said adapter ring having one end thereof adjacent said one end of said preform ring, and
  (c) said rings having facing surfaces at an acute angle to the longitudinal axis of said packing, said angles being different, said one end of said preform ring being adapted to form an I.D. seal, and said acute angles being in the axially outer direction, and said preform ring including means for maintaining the structural integrity thereof.

78. The apparatus according to claim 77 wherein said acute angles of said preform and adapter rings are approximately 45° and 60° respectively.

79. The apparatus according to claim 78 wherein said adapter ring is a higher density graphite ring.

80. A method for sealing a valve stem comprising installing in a stuffing box for said stem a packing including a low density graphite preform ring that is compressible and reformable, said preform ring having a density in the range of from about 0.5 to 1.4 g/cc, installing in contact with one end of said preform ring a higher density adapter ring made of a deformable, compression sealing material that has a density in the range of from about 1.4 to 1.7 g/cc, said adapter ring providing the facing surfaces of said preform and adapter rings with different acute angles in the same axial direction to the axis of said stem, axially compressing said packing and forcing said one end of said preform to flow radially and axially into contact with one of said stem or stuffing box to provide one of an O.D. or I.D. seal and compressing said seal into an impervious seal.

81. The method according to claim 80 wherein said acute angles of said preform and adapter rings are approximately 45° and 60° respectively.

82. The method according to claim 81 wherein said adapter ring is a higher density graphite ring.

* * * * *